March 4, 1924.

G. A. GILLEN

CUSHION WHEEL

Filed March 8, 1922

1,485,977

INVENTOR
George A. Gillen

BY
ATTORNEY

Patented Mar. 4, 1924.

1,485,977

UNITED STATES PATENT OFFICE.

GEORGE A. GILLEN, OF JERSEY CITY, NEW JERSEY, ASSIGNOR TO GILLEN LABORATORIES CORPORATION, OF NEW YORK, N. Y., A CORPORATION OF DELAWARE.

CUSHION WHEEL.

Application filed March 8, 1922. Serial No. 541,935.

*To all whom it may concern:*

Be it known that I, GEORGE A. GILLEN, a citizen of the United States, residing at Jersey City, in the county of Hudson and State of New Jersey, have invented new and useful Improvements in Cushion Wheels, of which the following is a specification.

This invention relates to improvements in resilient wheels, and has for its principal object, to provide a wheel which is designed to give the same effect as the pneumatic tire now commonly used on motor vehicles, and at the same time, eliminate the unsatisfactory factors accompanying the use of such.

Another object of the invention resides in the provision of a wheel having a plurality of telescopic spokes which are held in extending position on pneumatic cushions so that the entire structure will produce a decidedly resilient effect when in operation, and the danger of punctures and blowouts will be entirely eliminated.

As another object, the invention contemplates the provision of a wheel having a plurality of independently inflatable cushions so designed that the riding comfort of a car may be maintained at its maximum and the amount of flexibility of the spokes varied in proportion to the weight of the vehicle.

A further object of the invention is to provide a device which is so designed that should any individual spoke become inoperative, it may be readily removed, and other parts substituted therefor, without disturbing the remaining portions of the wheel.

A still further object of the invention is to provide a wheel of the resilient type, so designed as to avoid side lash and the consequent annoyances incident thereto.

Figure 1:
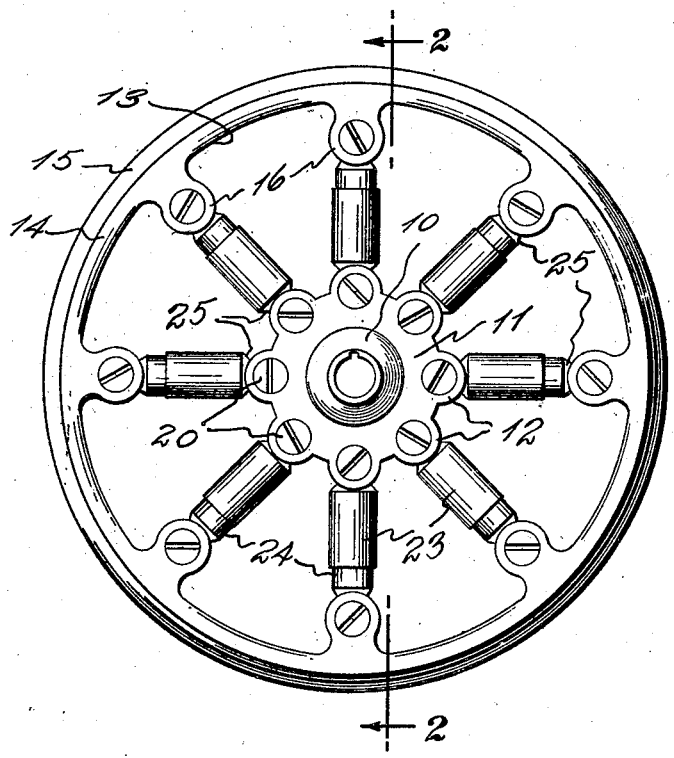
Figure 2:
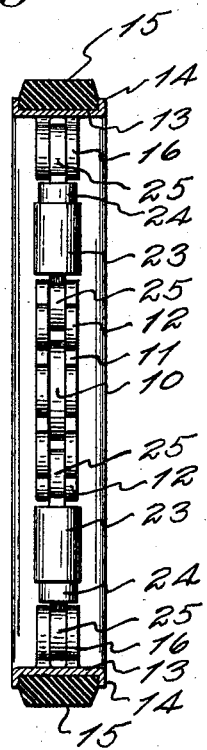
Figure 3:
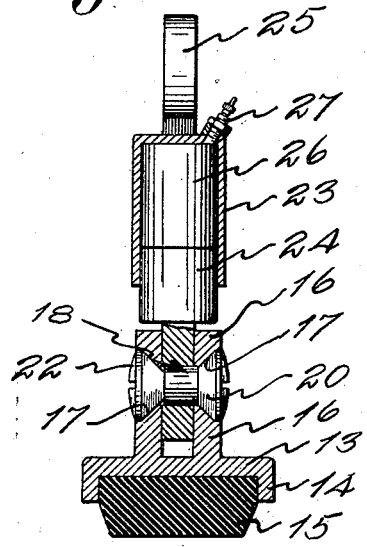
Figure 4:
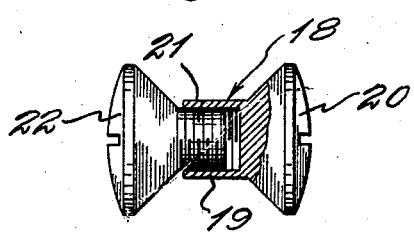

With these and other objects in view the invention consists in the novel construction, combination and arrangement of parts which will be fully set forth in the following specification, claimed and illustrated in the accompanying drawing, in which, Figure 1 is a side view of a wheel constructed in accordance with this invention, Figure 2 is a vertical sectional view taken on line 2—2 of Figure 1, showing the hub portion in full, Figure 3 is a vertical sectional view through one of the spoke members and the rim, and, Figure 4 is an enlarged detailed view of one of the bolts, showing a portion thereof in section, more clearly illustrating the details of construction.

Referring to the drawings in detail, the numeral 10 designates the wheel hub provided at opposite sides with plates 11 to which the spokes are attached. These plates are provided with ears 12 formed with central countersunk openings through which the attaching bolts extend.

The wheel rim 13 is provided with the usual flanges for retaining the tire 15 in position, and extending inwardly from the inner face of the rim are pairs of spaced ears 16, which are arranged radially and in alignment with ears 12, previously described. These ears 16 are provided with central openings which are countersunk as at 17, to receive the heads of the attaching bolts 18 by means of which the spokes are secured to the rim. As shown in Figure 4 these bolts each comprise an internally screw threaded member 19, provided with a slotted head 20, and an externally screw threaded shank 21, provided with the head 22. This shank fits within the sleeve 19, and thus it will be seen, that a smooth external bearing will be provided, upon which the spoke connecting element rides.

The spoke above referred to is best illustrated in Figure 3, and comprises a hollow cylindrical shell 23 into which a plunger 24 is adapted to fit. The opposite end of the shell is closed and provided with a bearing member 25 which is apertured to receive the sleeve 19 of the bolt 18. The outer end of the plunger 24 is likewise provided with a bearing member 25 which is also provided with an opening to receive the bolt by means of which it is secured to the rim 13. In order to hold the plunger in proper position and prevent the accidental telescoping of the spoke there is provided a hollow cushion 26 which is formed of a suitable flexible material, such as rubber, and extending through an opening formed at the shell 23 is a valve stem 27 through which the cushion 26 is inflated.

In use, the wheel is assembled as illustrated in Figures 1 and 2, and the chambers 26 are properly inflated so that the rim, in normal conditions will remain concentric with the hub. Obviously when power is applied to the hub for driving the vehicle forwardly, the hub will rotate for a short distance before sufficient power is transmitted to the rim to cause the vehicle to move, but owing to the construction, it will be seen that the losses will be but slight, and any loss thus incurred will be compensated for, through the fact that the air chamber is protected against blowouts, punctures and the like. Should the vehicle encounter an obstacle, it will be evident that certain of the spokes will be telescoped against their respective air cushions, so that the effect will be practically the same as that accompanying the use of the customary pneumatic tire.

While in the foregoing there has been shown and described the preferred embodiment of this invention, it is to be understood that certain minor changes, in the details of construction, combination and arrangement of parts may be resorted to without departing from the spirit and scope of the invention as claimed.

What is claimed is:—

1. A resilient wheel comprising a hub, a rim, telescopic spokes pivoted to the hub and to the rim, pneumatic cushions within the spokes, and means to inflate each cushion independently.

2. A resilient wheel comprising a rim, a hub, a plurality of telescopic spokes connecting hub and rim, and substantially independently inflated rubber cushions with each spoke exerting outward pressure on its telescoping parts, the rim being subjected to circumferential tension by the radial pressure exerted by the several spokes.

Signed at New York, in the county of New York and State of New York, this 6th day of March, 1922.

GEORGE A. GILLEN.